United States Patent
Matsumura et al.

(10) Patent No.: US 10,837,388 B2
(45) Date of Patent: Nov. 17, 2020

(54) ENGINE START CONTROLLER FOR VEHICLE

(71) Applicant: TOYOTA JIDOSHA KABUSHIKI KAISHA, Toyota (JP)

(72) Inventors: Yuji Matsumura, Toyota (JP); Atsushi Nagai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/267,447

(22) Filed: Feb. 5, 2019

(65) Prior Publication Data
US 2019/0249615 A1    Aug. 15, 2019

(30) Foreign Application Priority Data

Feb. 13, 2018    (JP) ................................ 2018-023189

(51) Int. Cl.
| | |
|---|---|
| *F02D 41/06* | (2006.01) |
| *F02D 41/00* | (2006.01) |
| *B60W 20/40* | (2016.01) |
| *F02N 11/04* | (2006.01) |
| *F02D 41/40* | (2006.01) |
| *F02D 29/02* | (2006.01) |

(52) U.S. Cl.
CPC .......... *F02D 41/062* (2013.01); *B60W 20/40* (2013.01); *F02D 29/02* (2013.01); *F02D 41/0097* (2013.01); *F02D 41/40* (2013.01); *F02N 11/04* (2013.01)

(58) Field of Classification Search
CPC ........ F02D 41/06; F02D 41/062; F02D 29/02; F02D 41/0097; F02D 41/40; B60W 20/40; F02N 11/04
See application file for complete search history.

(56) References Cited

U.S. PATENT DOCUMENTS 6,274,943 B1 * 8/2001 Hasegawa ................ B60K 6/46
290/38 R

FOREIGN PATENT DOCUMENTS

| DE | 60121275 | 7/2007 |
|---|---|---|
| DE | 102017110243 | 11/2017 |
| EP | 1 052 401 A2 | 11/2000 |
| JP | 2000-320366 | 11/2000 |
| JP | 2012-236568 | 12/2012 |

* cited by examiner

*Primary Examiner* — Hieu T Vo
(74) *Attorney, Agent, or Firm* — Oblon, McClelland, Maier & Neustadt, L.L.P.

(57) ABSTRACT

An engine start controller includes an injection amount calculating portion that is configured to calculate, as an assist injection amount, an injection amount of fuel injected from a fuel injection valve of an engine in an engine start-up period until the engine rotation speed exceeds a predetermined starting rotation speed from zero. The injection amount calculating portion is configured such that, in a case in which the rotation speed of the engine is higher than or equal to a threshold value that is a value less than the starting rotation speed, the injection amount calculating portion calculates the assist injection amount to be smaller when the engine is started by using the motor generator than when the engine is started by using the starter.

5 Claims, 3 Drawing Sheets

ENGINE START CONTROLLER FOR VEHICLE

BACKGROUND

The present disclosure relates to an engine start controller for a vehicle.

In a hybrid system of a vehicle disclosed in Japanese Laid-Open Patent Publication No. 2012-236568, as a driving source of the vehicle, an engine and a motor generator drivably coupled to the engine are provided. The above-described hybrid system is also provided with a starter for starting the engine. The hybrid system is able to not only start the engine by using the starter but also start the engine by using the motor generator. The above-described hybrid system is also provided with an engine start controller to control a fuel injection amount at the time of starting the engine. The engine start controller calculates the fuel injection amount in accordance with the engine rotation speed according to a predetermined map.

In the above-described hybrid system, the starter and the motor generator each adopt a different type of electric motor. Specifically, it is common that, for example, a direct current electric motor and an alternating current electric motor are adopted as the starter and the motor generator, respectively. Therefore, the starter and the motor generator are different in output characteristics, resulting in a difference in magnitude of rotational torque that can be applied to the crankshaft of the engine at the time of starting the engine. The fuel injection amount may be insufficient or in excess if control of fuel injection at the time of starting the engine by using the starter is applied to the start of the engine by using the motor generator despite the above-described difference in output characteristics.

SUMMARY

In accordance with one aspect of the present disclosure, an engine start controller that is configured to be mounted on a vehicle is provided. The vehicle is provided with an engine as a driving source of the vehicle, a motor generator that is drivably coupled to the engine, and a starter configured to start the engine. The engine start controller includes an injection amount calculating portion that is configured to calculate, as an assist injection amount, an injection amount of fuel injected from a fuel injection valve of the engine in an engine start-up period until the engine rotation speed exceeds a predetermined starting rotation speed from zero. The injection amount calculating portion is configured such that, in a case in which the rotation speed of the engine is higher than or equal to a threshold value that is a value less than the starting rotation speed, the injection amount calculating portion calculates the assist injection amount to be smaller when the engine is started by using the motor generator than when the engine is started by using the starter.

In the above-described configuration, the starter is an electric motor that is only used in starting the engine. Therefore, when the engine rotation speed is extremely small, a high rotational torque can be applied to the crankshaft. However, the rotational torque that can be applied to the crankshaft is decreased with an increase in the engine rotation speed. Consequently, when the starter is used to start the engine, the starting torque cannot be covered only by the rotational torque derived from the starter, except for an initial stage of starting the engine, in which the engine rotation speed is extremely small. Thus, conventionally, when the engine is started by using the starter, an adequate amount of fuel is injected for combustion, thereby compensating the rotational torque.

On the other hand, the motor generator also functions as a driving source of a vehicle. Thus, even if the engine rotation speed is relatively high, the rotational torque can be applied to the crankshaft. Consequently, when the engine is started by using the motor generator, the starting torque can be applied to the crankshaft, even if the assist injection amount is small.

According to the above-described configuration, the assist injection amount can be calculated with the difference in output characteristics between the starter and the motor generator taken into account. That is, when the engine is started by using the motor generator, after the engine rotation speed has reached a threshold value, the assist injection amount becomes smaller than the assist injection amount when the starter is used. Consequently, the fuel consumption amount necessary for starting the engine can be decreased as compared with a case where the assist injection amount at the time of starting the engine by using the starter is applied to a case where the engine is started by using the motor generator.

In the above-described configuration, the engine start controller includes a starting torque calculating portion that is configured to calculate, as a starting torque, rotational torque that needs to be applied to a crankshaft in order to start the engine in accordance with a state of the engine, and a motor generator torque calculating portion that is configured to calculate, as a motor generator torque, rotational torque that can be applied to the crankshaft by the motor generator in accordance with a state of the motor generator. The injection amount calculating portion is configured to set the threshold value to the rotation speed of the engine when the motor generator torque is in agreement with the starting torque, and calculate the assist injection amount as a positive value when the rotation speed of the engine is less than the threshold value.

According to the above-described configuration, when the engine rotation speed is less than the threshold value, that is, when the torque of the motor generator is smaller than the starting torque, fuel is injected for combustion, thereby compensating the rotational torque. Consequently, it is possible to start the engine reliably and smoothly by using the motor generator.

In the above-described configuration, the injection amount calculating portion is configured to calculate the assist injection amount such that, when the engine rotation speed is less than the threshold value, the greater a difference between the motor generator torque and the starting torque, the greater the assist injection amount becomes.

According to the above-described configuration, it is possible to calculate the assist injection amount in accordance with the insufficiency in the motor generator torque with respect to the starting torque. Consequently, it is possible to further decrease the insufficiency or excess of the assist injection amount in compensating the rotational torque by fuel injection.

In the above-described configuration, the injection amount calculating portion is configured to calculate the assist injection amount to be zero when the engine rotation speed is higher than or equal to the threshold value.

According to the above-described configuration, when the engine rotation speed is greater than or equal to the threshold value, that is, when the torque of the motor generator is greater than the starting torque, no fuel is injected. Consequently, while the motor generator is used to reliably start the engine, it is possible to minimize the fuel consumption amount during starting of the engine.

In the above-described configuration, the threshold value is determined in advance as a rotation speed higher than or equal to an engine rotation speed when rotational torque that can be applied to the crankshaft by the motor generator is in agreement with rotational torque that needs to be applied to the crankshaft in order to start the engine. The injection amount calculating portion is configured to calculate the assist injection amount to be a positive value when the rotation speed of the engine is less than the threshold value, and calculate the assist injection amount to be zero when the rotation speed of the engine is higher than or equal to the threshold value.

According to the above-described configuration, it is possible to determine whether the assist injection amount is given a positive value or zero based on comparison between the engine rotation speed and a predetermined threshold value. Consequently, the processing load for calculating the assist injection amount at the time of starting the engine is decreased.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

Hereinafter, an embodiment will be described. First, according to FIG. 1, a description will be given of a schematic configuration of a hybrid system of a vehicle.

Figure 1:
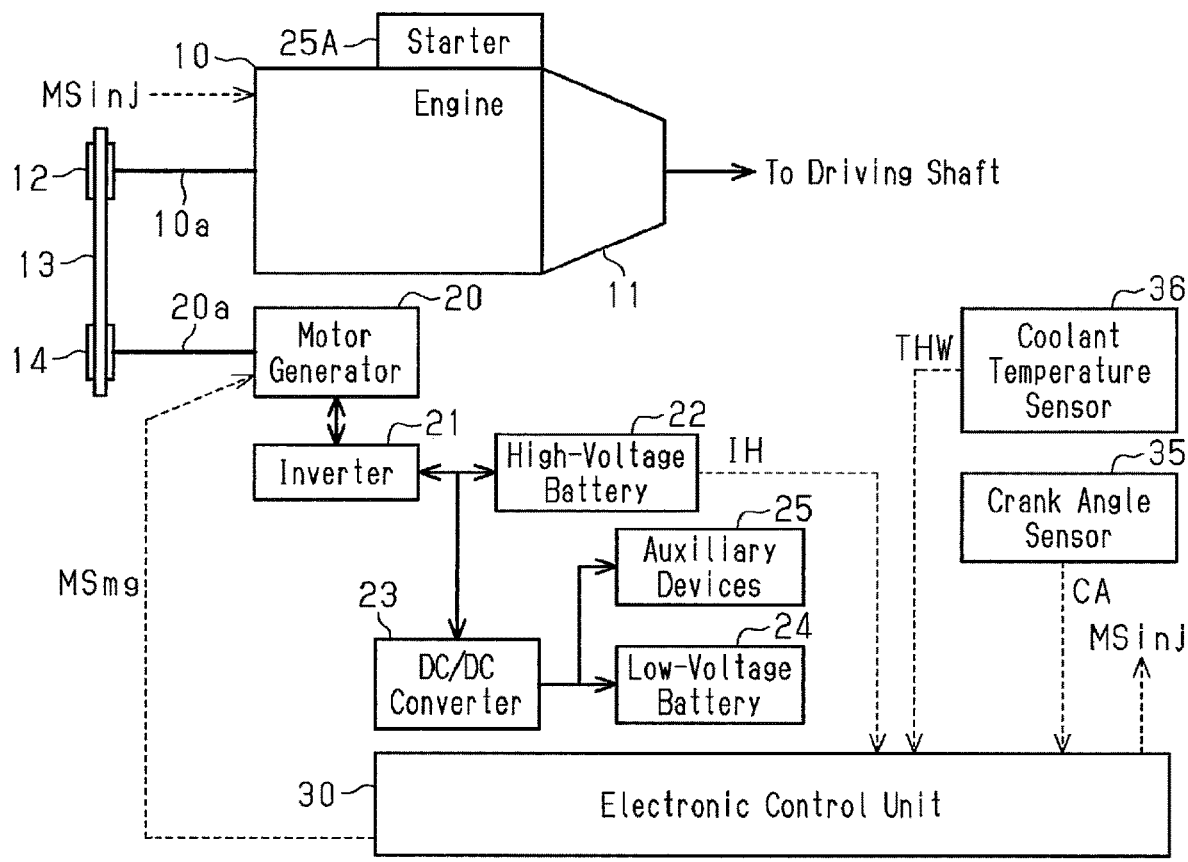
FIG. 1 is a schematic diagram showing the configuration of a hybrid system of a vehicle.

As shown in FIG. 1, the hybrid system is provided with an engine 10 as a driving source. A crankshaft 10a of the engine 10 is drivably coupled to the driven wheels via a transmission 11 and the like. The crankshaft 10a of the engine 10 is also drivably coupled to a first pulley 12. A transfer belt 13 is looped over the first pulley 12. Although not shown in the drawing, the crankshaft 10a of the engine 10 is also drivably coupled to a hydraulic pump that generates a hydraulic pressure, a compressor for an air conditioner, and the like, via belts, pulleys, gears (sprockets), chains, and the like.

The hybrid system is provided with a motor generator 20 as another driving source separately from the above-described engine 10. The motor generator 20 is a three-phase alternating current electric motor. An output shaft 20a of the motor generator 20 is drivably coupled to the second pulley 14. A transfer belt 13 is looped over the second pulley 14. That is, the motor generator 20 is drivably coupled to the crankshaft 10a of the engine 10 via the second pulley 14, the transfer belt 13 and the first pulley 12.

The motor generator 20 applies rotational torque to the second pulley 14 when functioning as an electric motor, and the rotational torque is input to the crankshaft 10a of the engine 10 via the transfer belt 13 and the first pulley 12. That is, in this case, the motor generator 20 assists driving of the engine 10. On the other hand, when the motor generator 20 functions as a generator, the rotational torque of the crankshaft 10a of the engine 10 is input to an output shaft 20a of the motor generator 20 via the first pulley 12, the transfer belt 13 and the second pulley 14. Then, the motor generator 20 generates electricity in response to rotation of the output shaft 20a.

A high-voltage battery 22 is connected to the motor generator 20 via an inverter 21. The inverter 21 is a bidirectional inverter, converting an alternating current voltage generated by the motor generator 20 to a direct current voltage to output it to the high-voltage battery 22 and converting a direct current voltage output by the high-voltage battery 22 to an alternating current voltage to output it to the motor generator 20. In FIG. 1, the inverter 21 is depicted as being separate from the motor generator 20. However, there is a case that the inverter 21 is housed inside a casing of the motor generator 20.

The high-voltage battery 22 is a 48 V lithium-ion battery. When the motor generator 20 functions as an electric motor, the high-voltage battery 22 supplies electric power to the motor generator 20. Further, when the motor generator 20 functions as a generator, the high-voltage battery 22 is charged by receiving the electric power supplied from the motor generator 20.

A DC/DC converter 23 is connected to the motor generator 20 via the inverter 21. The DC/DC converter 23 is also connected to the high-voltage battery 22. The DC/DC converter 23 outputs a direct current voltage output from the inverter 21 and the high-voltage battery 22 by lowering the voltage down to 12 V to 15 V. A low-voltage battery 24 is connected to the DC/DC converter 23.

The low-voltage battery 24 is a 12 V lead-acid battery that is lower in voltage than the high-voltage battery 22. The low-voltage battery 24 outputs a 12 V direct current voltage when no DC/DC converter 23 is activated or an output voltage of the DC/DC converter 23 is 12 V. When the output voltage of the DC/DC converter 23 is higher than an open circuit voltage (OCV) of the low-voltage battery 24, the low-voltage battery 24 is charged by receiving the electric power supplied from the DC/DC converter 23.

Various types of auxiliary devices 25 are connected to the DC/DC converter 23 and the low-voltage battery 24. The auxiliary devices 25 include, for example, the lights of the vehicle such as the headlights, the turn signals, and the interior light as well as the interior devices such as the car navigation system and the speakers. The auxiliary devices 25 receive the electric power supplied from the low-voltage battery 24 when DC/DC converter 23 is not activated. When the output voltage of the DC/DC converter 23 is higher than the open circuit voltage (OCV) of the low-voltage battery 24, the auxiliary devices 25 receive the electric power supplied from the DC/DC converter 23.

A starter 25A for starting the engine 10, which is one of the auxiliary devices 25, is connected to each of the DC/DC converter 23 and the low-voltage battery 24. The starter 25A is a direct current electric motor, and the output shaft of the starter 25A is drivably coupled to the crankshaft 10a of the engine 10. The starter 25A is activated by receiving the electric power supplied from the low-voltage battery 24 and the DC/DC converter 23.

The hybrid system is provided with an electronic control unit 30 which controls the engine 10, the motor generator 20, and the like. The electronic control unit 30 is processing circuitry (computer) that includes an arithmetic portion for executing various types of programs (applications), a non-volatile storage portion for storing programs and the like, and a volatile memory in which data is temporarily stored in executing programs.

Signals that indicate the state of the engine 10 are input to the electronic control unit 30 from the various types of sensors, and the like mounted on the vehicle. Specifically, a signal that indicates a rotational position CA of the crankshaft 10a is input to the electronic control unit 30 from a crank angle sensor 35. The crank angle sensor 35 detects the rotational position CA of the crankshaft 10a of the engine 10 every unit time.

A signal that indicates a coolant temperature THW of the engine 10 is input to the electronic control unit 30 from a coolant temperature sensor 36. The coolant temperature sensor 36 is attached to the outlet portion of the water jacket, which is defined in the cylinder block and the interior of the cylinder head in the engine 10 and detects the temperature of coolant at the outlet portion of the water jacket as the coolant temperature THW.

A signal that indicates status information IH of the high-voltage battery 22 is also input to the electronic control unit 30 from the high-voltage battery 22. The status information IH of the high-voltage battery 22 includes the output voltage value, the output current value, and the temperature of the high-voltage battery 22. The electronic control unit 30 calculates the state of charge (SOC) of the high-voltage battery 22 based on the status information IH of the high-voltage battery 22. In this embodiment, the state of charge of the high-voltage battery 22 is expressed in terms of the ratio of electric power charged in the high-voltage battery 22 when the status information IH has been input with respect to electric power when the high-voltage battery 22 has been fully charged, for example, in percentage (%). Although not shown, a signal that indicates status information (such as the output voltage value, the output current value, and the temperature) of the low-voltage battery 24 is input to the electronic control unit 30 from the low-voltage battery 24. The electronic control unit 30 calculates the state of charge and the like of the low-voltage battery 24 based on the status information of the low-voltage battery 24.

The above-described electronic control unit 30 generates a manipulation signal MSmg for controlling the motor generator 20 based on various types of signals and outputs the manipulation signal MSmg to the motor generator 20. The electronic control unit 30 also outputs a manipulation signal MSinj for controlling a fuel injection valve of the engine 10 based on various types of input signals. The fuel injection valve of the engine 10 is opened during a period of time corresponding to the manipulation signal MSinj for injecting fuel in an amount corresponding to the period of time when the valve is opened. That is, the electronic control unit 30 controls the fuel injection amount per injection from the fuel injection valve of the engine 10 with reference to the manipulation signal MSinj.

Further, the electronic control unit 30 determines which one of the starter 25A and the motor generator 20 will be used to start the engine 10 when a request for starting the engine 10 is made in a state in which the engine 10 is stopped. Specifically, the electronic control unit 30 determines to start the engine 10 by using the starter 25A when the driver of the vehicle requests to start in association with such operation that an ignition switch (which is also referred to as an engine start switch, a system activating switch, and the like) is switched on. The electronic control unit 30 determines to start the engine 10 by using the motor generator 20 when the driver requests automatic restart after the engine 10 has been stopped temporarily (idling stop), for example, while waiting for a traffic light to change.

When the electronic control unit 30 determines to start the engine 10 by using the starter 25A, it calculates a fuel injection amount from the fuel injection valve of the engine 10 during a start-up period of the engine 10 as an assist injection amount Qf. In this embodiment, when the starter 25A is used to start the engine 10, during the entire start-up period of the engine 10, a predetermined assist injection amount Qf is calculated. Further, when the electronic control unit 30 determines to start the engine 10 by using the motor generator 20, it calculates a fuel injection amount from the fuel injection valve of the engine 10 during the start-up period of the engine 10 as an assist injection amount Qf. As described so far, the electronic control unit 30 functions as a start controller for the engine 10 of a vehicle.

Next, a description will be given of a relationship between a maximum motor generator torque TQmg (hereinafter, abbreviated as maximum MG torque TQmg) that can be output by the motor generator 20 of the above-described embodiment and a required starting torque TQsta that is necessary to start the engine 10.

Figure 2:
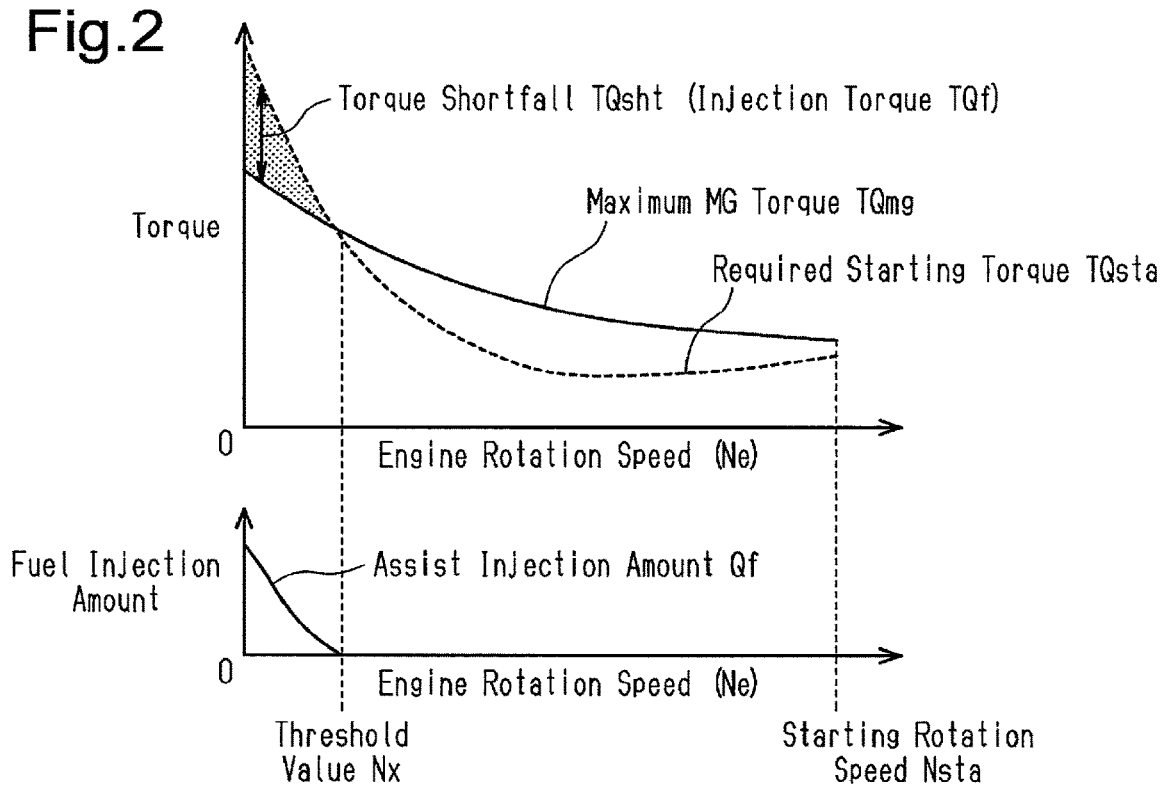
FIG. 2 is a graph showing a relationship of a maximum MG torque and a required starting torque with the rotation speed of the engine.

When the engine 10 is started, the engine rotation speed Ne is controlled so as to reach the starting rotation speed Nsta within a predetermined period of time. Then, as described above, a required starting torque TQsta that needs to be applied to the crankshaft 10a of the engine 10 for increasing the engine rotation speed Ne is determined as a function of the engine rotation speed Ne. As shown in FIG. 2, the required starting torque TQsta is the maximum when the engine rotation speed Ne is zero and decreased with an increase in the engine rotation speed Ne from zero. Then, the required starting torque TQsta becomes approximately constant in value until the engine rotation speed Ne becomes relatively high and reaches the starting rotation speed Nsta.

On the other hand, the maximum MG torque TQmg, which is the maximum torque that the motor generator 20 is able to apply to the crankshaft 10a of the engine 10 on a moment to moment basis is the maximum when the engine rotation speed Ne is zero and decreased with an increase in the engine rotation speed Ne from zero. Nevertheless, the ratio of decreasing the maximum MG torque TQmg is moderate, as compared with the ratio of decreasing the required starting torque TQsta when the engine rotation speed Ne is small. Therefore, when the engine rotation speed Ne is small, the maximum MG torque TQmg is smaller than the required starting torque TQsta, and when the engine rotation speed Ne is high, the maximum MG torque TQmg is higher than the required starting torque TQsta.

That is, it is assumed that the engine rotation speed Ne when the maximum MG torque TQmg is in agreement with the required starting torque TQsta is defined as a threshold value Nx. Further, when the engine rotation speed Ne is less than the threshold value Nx, the maximum MG torque TQmg is smaller than the required starting torque TQsta to cause a torque shortfall TQsht. On the other hand, when the engine rotation speed Ne is higher than or equal to the threshold value Nx, the maximum MG torque TQmg meets the required starting torque TQsta.

Figure 3:
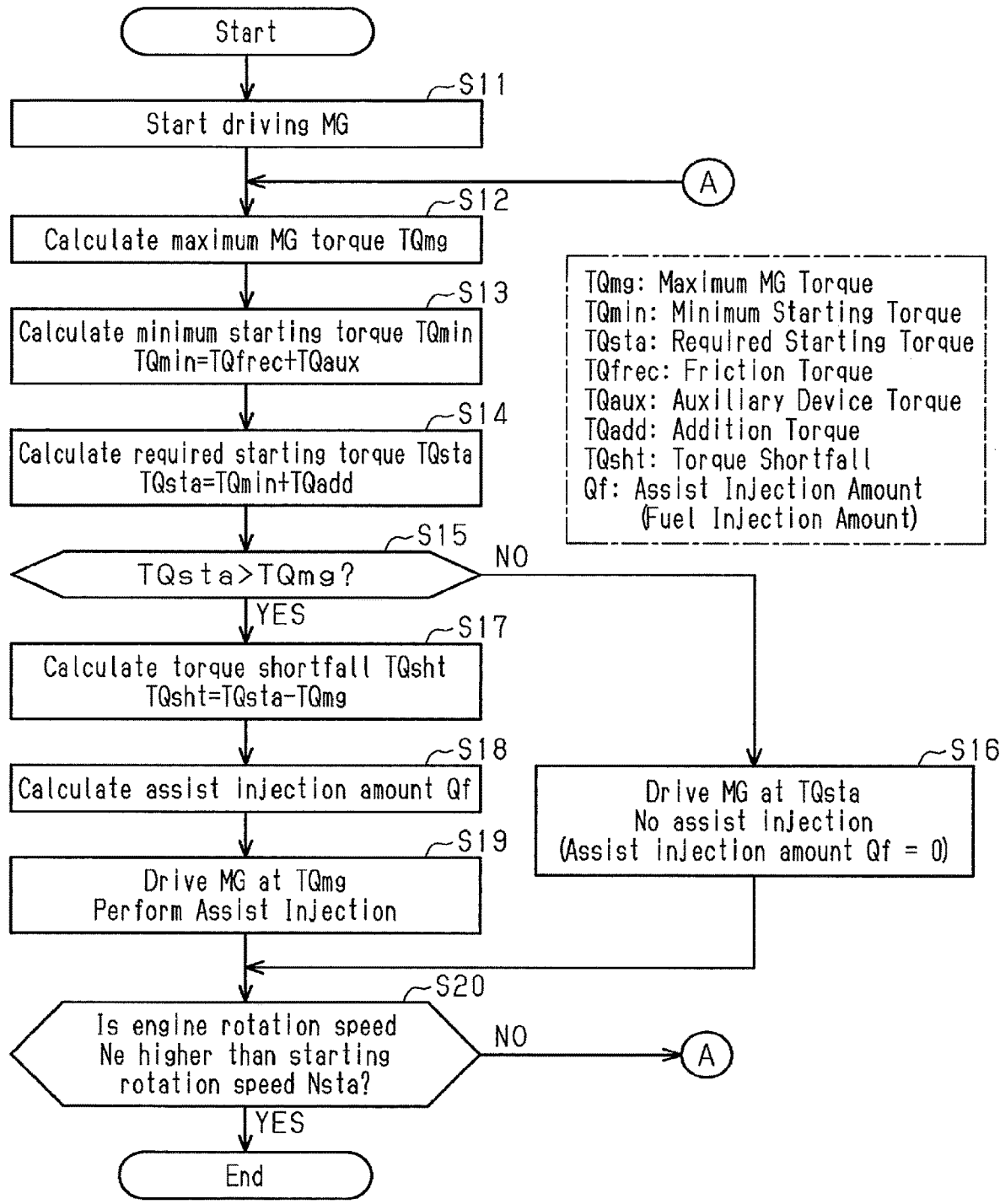
FIG. 3 is a flowchart showing an engine start control process.

Next, a description will be given of a start control process when the engine 10 is started by using the motor generator 20 with reference to FIG. 3.

When the electronic control unit 30 determines the start of the engine 10 by using the motor generator 20 upon request for automatic restart, it starts a series of the start control process to execute the process of Step S11.

In Step S11, the electronic control unit 30 outputs the manipulation signal MSmg to the motor generator 20, thereby starting to drive the motor generator 20. Thereby, rotational torque is input to the crankshaft 10a of the engine 10 from the motor generator 20, thereby increasing the engine rotation speed Ne. Thereafter, the process by the electronic control unit 30 moves to Step S12.

In Step S12, the electronic control unit 30 calculates the maximum MG torque TQmg, which is the maximum rotational torque that can be applied to the crankshaft 10a of the engine 10 by the motor generator 20 at the time of executing Step S12. Specifically, the electronic control unit 30 calculates the state of charge of the high-voltage battery 22 based on status information IH from the high-voltage battery 22. Then, when the state of charge of the high-voltage battery 22 is higher than or equal to a certain value (for example, 30 to 40%), electric current input from the high-voltage battery 22 to the motor generator 20 is the maximum rated input of the motor generator 20. Further, when the state of charge of the high-voltage battery 22 is less than the above-described certain value, the lower the state of charge is, the smaller the electric current input from the high-voltage battery 22 to the motor generator 20 becomes. Still further, the electronic control unit 30 calculates the rotation speed of the crankshaft 10a per unit time based on the difference between the latest rotational position CA at the time of the process in Step S12 detected by the crank angle sensor 35 and the rotational position CA, which has been detected in one step before the step concerned, which is defined as the engine rotation speed Ne of the engine 10. Then, when the motor generator 20 is driven by the input electric current determined as described above, the rotational torque that can be applied to the crankshaft 10a is calculated as the maximum MG torque TQmg in accordance with the engine rotation speed Ne.

The relationship between the maximum MG torque TQmg and the engine rotation speed Ne is as described above. Consequently, in the graph of FIG. 2, such a state that a curve of the maximum MG torque TQmg moves downward in parallel is developed, with a decrease in state of charge of the high-voltage battery 22 and also a decrease in electric current input to the high-voltage battery 22. As described above, the electronic control unit 30 functions as a motor generator torque calculating portion. After the process in Step S12, the process by the electronic control unit 30 moves to Step S13.

In Step S13, the electronic control unit 30 calculates a theoretical (calculated) minimum value of the rotational torque that needs to be applied to the crankshaft 10a in starting the engine 10 at the time of executing Step S13 as a minimum starting torque TQmin. Specifically, the electronic control unit 30 calculates a friction torque TQfrec and an auxiliary device torque TQaux corresponding to a coolant temperature THW detected by the coolant temperature sensor 36. The friction torque TQfrec is torque that is necessary to rotate the crankshaft 10a against frictional force between various types of members sliding in association with rotation of the crankshaft 10a such as the friction between the piston and the inner circumferential surface of the cylinder and the friction between the crankshaft 10a and the bearings, and the torque is calculated as a greater value with a decrease in coolant temperature THW. The auxiliary device torque TQaux is torque that is necessary to drive a hydraulic pump, which is drivably coupled to the crankshaft 10a, a compressor, and the like, and calculated as a greater value with a decrease in coolant temperature THW. Then, the electronic control unit 30 calculates a value obtained by adding the friction torque TQfrec to the auxiliary device torque TQaux as a minimum starting torque TQmin. Thereafter, the process by the electronic control unit 30 moves to Step S14.

In Step S14, the electronic control unit 30 calculates the required starting torque TQsta by adding an addition torque TQadd to the minimum starting torque TQmin calculated in Step S13. The addition torque TQadd compensates the difference between rotational torque that needs to be actually applied to the crankshaft 10a and the theoretical minimum starting torque TQmin, for example, due to a change in the engine 10 over time, and the like, and it is a predetermined positive fixed value. As described above, the electronic control unit 30 functions as a starting torque calculating portion, which calculates rotational torque that needs to be applied to the crankshaft 10a for starting the engine 10, in accordance with the state of the engine 10 as a starting torque (required starting torque TQsta). After calculation of the required starting torque TQsta, the process by the electronic control unit 30 moves to Step S15.

In Step S15, the electronic control unit 30 determines whether the required starting torque TQsta is higher than the maximum MG torque TQmg. When the required starting torque TQsta is determined to be less than or equal to the maximum MG torque TQmg (NO in Step S15), the process by the electronic control unit 30 moves to Step S16. As shown in FIG. 2, the threshold value Nx is set to the engine rotation speed Ne when the required starting torque TQsta is in agreement with the maximum MG torque TQmg. In this case, the required starting torque TQsta being less than or equal to the maximum MG torque TQmg is synonymous with the engine rotation speed Ne being greater than or equal to the threshold value Nx.

In Step S16, the electronic control unit 30 controls the motor generator 20 so that the manipulation signal MSmg will be output to the motor generator 20 to apply the required starting torque TQsta to the crankshaft 10a of the engine 10. The electronic control unit 30 also calculates the assist injection amount Qf to be zero. That is, the electronic control unit 30 outputs the manipulation signal MSinj to the fuel injection valve of the engine 10 so that no fuel will be injected from the fuel injection valve.

On the other hand, in Step S15, when the required starting torque TQsta is determined to be higher than the maximum MG torque TQmg (YES in Step S15), the process by the electronic control unit 30 moves to Step S17. As shown in FIG. 2, that the threshold value Nx is set to the engine rotation speed Ne when the required starting torque TQsta is in agreement with the maximum MG torque TQmg. In this case, the required starting torque TQsta being higher than the maximum MG torque TQmg is synonymous with the engine rotation speed Ne being less than the threshold value Nx.

In Step S17, the electronic control unit 30 calculates the torque shortfall TQsht by subtracting the maximum MG torque TQmg from the required starting torque TQsta. Thereafter, the process by the electronic control unit 30 moves to Step S18.

In Step S18, the electronic control unit 30 calculates an assist injection amount Qf necessary to compensate the torque shortfall TQsht in accordance with the torque shortfall TQsht calculated in Step S17. The assist injection amount Qf is determined as a parameter of intake such as the intake temperature and the intake pressure as well as a function of the torque shortfall TQsht and calculated as a value in which the assist injection amount Qf is increased with an increase in the torque shortfall TQsht. As described so far, the electronic control unit 30 functions as an injection amount calculating portion that calculates an assist injection amount that is injected from the fuel injection valve of the engine 10 during the start-up period of the engine 10. After Step S18, the process by the electronic control unit 30 moves to Step S19.

In Step S19, the electronic control unit 30 outputs the manipulation signal MSmg to the motor generator 20, thereby controlling the motor generator 20 so that the maximum MG torque TQmg can be applied to the crankshaft 10a of the engine 10. The electronic control unit 30 also outputs the manipulation signal MSinj to the fuel injection valve of the engine 10 so that fuel in the assist injection amount Qf calculated in Step S18 can be injected from the fuel injection valve. Thereafter, the process by the electronic control unit 30 moves to Step S20.

In Step S20, the electronic control unit 30 determines whether the engine rotation speed Ne at the time of executing Step S20 is higher than a predetermined starting rotation speed Nsta. The starting rotation speed Nsta is determined as a minimum rotation speed at which the engine 10 is able to keep driving independently without receiving the torque from the starter 25A and the motor generator 20, for example, several hundred revolutions per minute. When the engine rotation speed Ne is determined to be less than or equal to the starting rotation speed Nsta (NO in Step S20), the process by the electronic control unit 30 returns to Step S12, and the subsequent processes are performed again. When the engine rotation speed Ne is determined to be higher than the starting rotation speed Nsta (YES in Step S20), a series of the start control process is ended.

After the start control process is ended, the electronic control unit 30 controls the fuel injection amount from the fuel injection valve of the engine 10 and the output of the motor generator 20, in accordance with the state of the engine 10 and operation of the vehicle by the driver.

An operation and advantages of the present embodiment will now be described.

Figure 4:
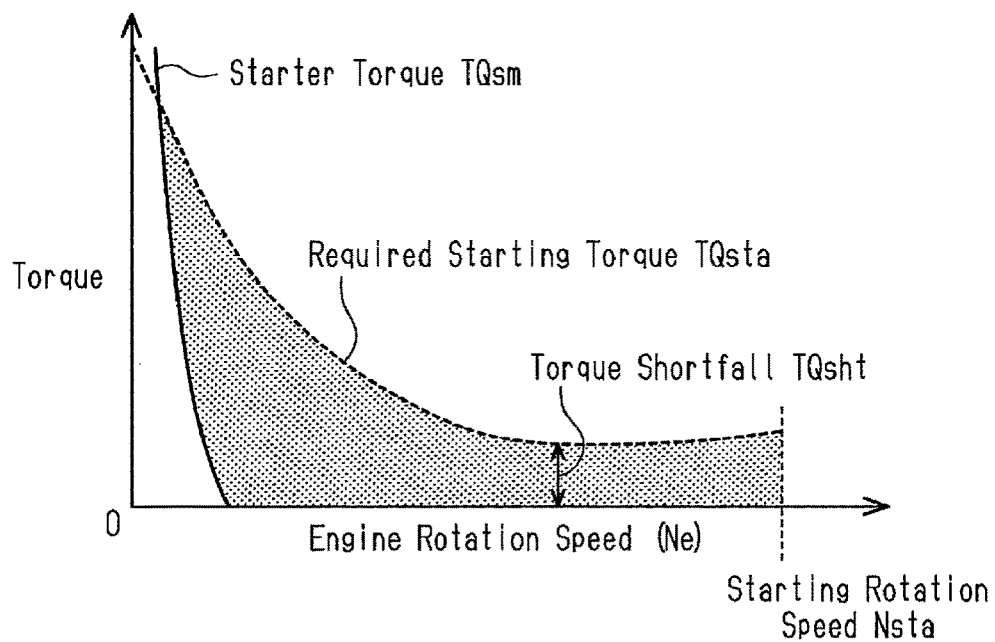
FIG. 4 is a graph showing a relationship of a starter torque and a required starting torque with the rotation speed of the engine.

First, a description will be given of the characteristics of the starter 25A of the present embodiment. The starter 25A of the present embodiment is a direct current electric motor provided for starting the engine 10. Therefore, as shown in FIG. 4, the starter torque TQsm, which is rotational torque that can be applied to the crankshaft 10a by the starter 25A, is relatively high when the engine rotation speed Ne of the engine 10 is extremely small. On the other hand, with an increase in the engine rotation speed Ne of the engine 10, the starter torque TQsm of the starter 25A will become smaller abruptly. When the engine rotation speed Ne exceeds a certain level (for example, 200 to 300 rpm), the starter 25A is no longer able to apply rotational torque to the crankshaft 10a. Consequently, the assist injection amount Qf is calculated in order to compensate the torque shortfall TQsht, which is shortage of the starter torque TQsm with respect to the required starting torque TQsta. In the present embodiment, a fixed value of the assist injection amount Qf is calculated until the engine rotation speed Ne reaches the starting rotation speed Nsta.

Figure 5:
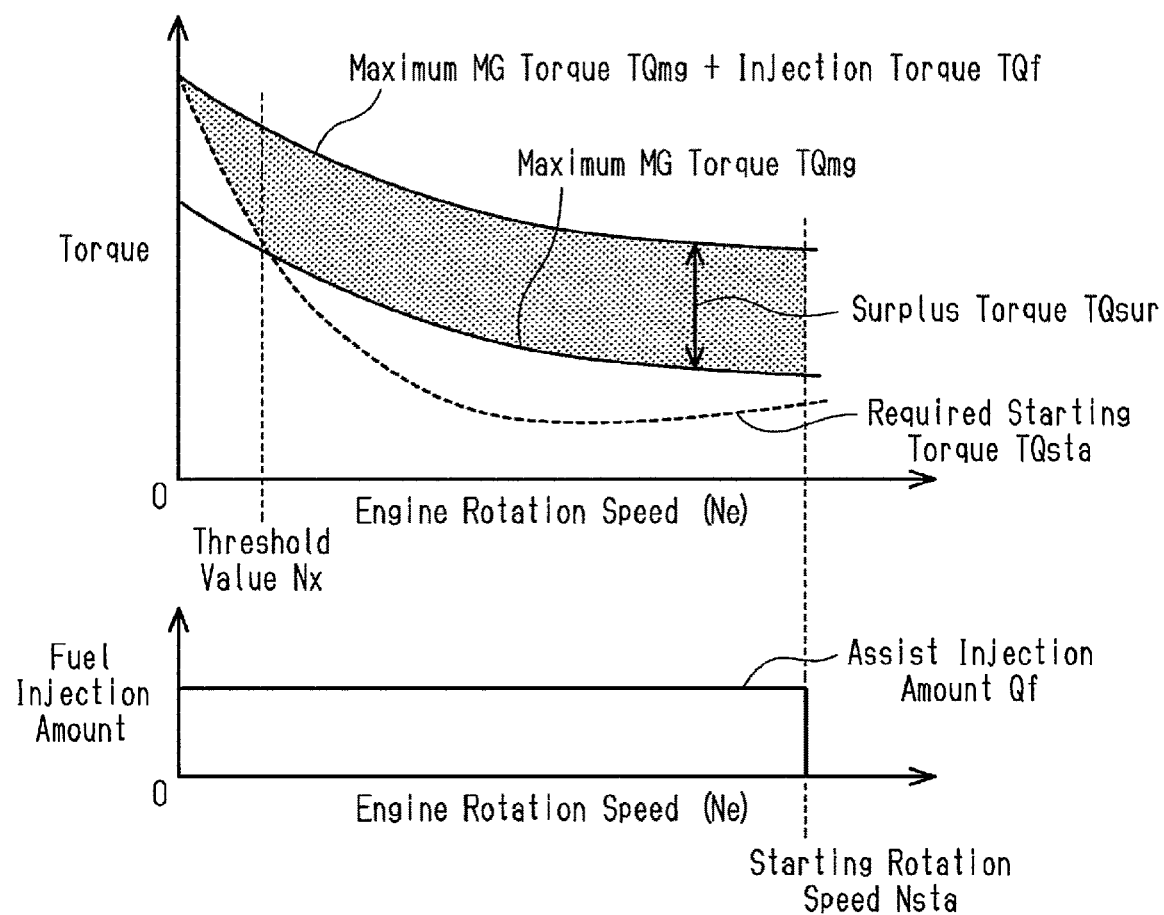
FIG. 5 is a graph showing a relationship of each torque with the rotation speed of the engine on the assumption that an assist injection amount at the time of starting the engine by using the starter is applied at the time of starting the engine by using a motor generator.

On the other hand, as shown in FIG. 5, when the engine rotation speed Ne is small, the maximum MG torque TQmg of the motor generator 20 is not so high as compared with the starter torque TQsm of the starter 25A. However, an adequate magnitude is kept even when the engine rotation speed Ne becomes relatively high. It is assumed that, at the time of starting the engine 10 by using the above-described motor generator 20, as with the time of starting the engine 10 by using the starter 25A, fuel is injected in a constant assist injection amount Qf. In this case, rotational torque applied to the crankshaft 10a is such that the injection torque TQf obtained by injection of fuel in the assist injection amount Qf is added to the maximum MG torque TQmg. Then, despite the fact that the engine rotation speed Ne is higher than or equal to the threshold value Nx and the maximum MG torque TQmg is higher than or equal to the required starting torque TQsta, fuel is injected, resulting in the occurrence of a surplus torque TQsur. Consequently, fuel necessary to generate the surplus torque TQsur is excessive in starting the engine 10.

In contrast, in the present embodiment, as shown in FIG. 2, when the engine rotation speed Ne is higher than or equal to the threshold value Nx and the maximum MG torque TQmg is higher than or equal to the required starting torque TQsta, the assist injection amount Qf is calculated to be zero. That is, if the maximum MG torque TQmg of the motor generator 20 is torque sufficient in starting the engine 10, no fuel is injected from the fuel injection valve. Consequently, as described above, it is possible to suppress injection of excessive fuel in starting the engine 10.

Further, in the present embodiment, when the engine rotation speed Ne is higher than or equal to the threshold value Nx and the maximum MG torque TQmg is less than the required starting torque TQsta, the assist injection amount Qf is calculated to be a positive value and fuel is injected from the fuel injection valve. That is, the maximum MG torque TQmg of the motor generator 20 fails to meet the torque necessary to start the engine 10 and, therefore, the rotational torque is compensated by fuel injection from the fuel injection valve. Consequently, it is possible to prevent a long time taken to starting the engine 10 or a failure of starting the engine 10 due to an excessively small rotational torque applied to the crankshaft 10a of the engine 10. That is, it is possible to start the engine 10 reliably and smoothly by using the motor generator 20.

Further, in the present embodiment, in a case where the engine rotation speed Ne is higher than or equal to the threshold value Nx and the maximum MG torque TQmg is less than the required starting torque TQsta, the assist injection amount Qf is calculated corresponding to the torque shortfall TQsht obtained by subtracting the maximum MG torque TQmg from the required starting torque TQsta. Consequently, shortage or surplus of the assist injection amount Qf can be further decreased in compensating rotational torque by injection of fuel.

Still further, in the present embodiment, when the engine rotation speed Ne is higher than or equal to the threshold value Nx and the maximum MG torque TQmg is higher than or equal to the required starting torque TQsta, the motor generator 20 is controlled at the required starting torque TQsta. Consequently, it is possible to decrease the consumption of electric power of the high-voltage battery 22, as compared with a case that the motor generator 20 is controlled always at the maximum MG torque TQmg when the engine 10 is started by using the motor generator 20.

The present embodiment may be modified as follows. The present embodiment and the following modifications can be combined as long as the combined modifications remain technically consistent with each other.

A mode in which the motor generator 20 is drivably coupled to the engine 10 is not limited to the above-described embodiment. In addition to the first pulley 12, the transfer belt 13 and the second pulley 14, for example, a reduction gear configured with a plurality of gears and a clutch for connecting and disconnecting a driving-force transmission path may be interposed between the engine 10 and the motor generator 20.

With regard to the high-voltage battery 22 and the low-voltage battery 24, any output voltage is acceptable. As the high-voltage battery 22, a battery with an output voltage lower than 48 V may be adopted or a battery with an output voltage higher than 48 V may be adopted. Further, the output voltage of the low-voltage battery 24 does not necessarily need to be lower than that of the high-voltage battery 22, and they may be equal in output voltage.

Types of the high-voltage battery 22 and the low-voltage battery 24 are not limited to those described in the above-described embodiment. As the high-voltage battery 22 and the low-voltage battery 24, in addition to a lithium-ion battery and a lead-acid battery, for example, a nickel metal hydride battery and a sodium-sulfur (NAS) battery may be adopted.

A motor generator that mainly assists the traveling torque of the engine 10 and a motor generator that generates electricity mainly by torque from the engine 10 may be provided separately. In this case, the motor generator that assists the traveling torque of the engine 10 may be used to start the engine 10.

In the above-described embodiment, when the engine rotation speed Ne is more than or equal to the threshold value Nx (the required starting torque TQsta is less than or equal to the maximum MG torque TQmg), the assist injection amount Qf is calculated to be zero. However, the assist injection amount Qf does not necessarily need to be zero. If it is an amount smaller than the assist injection amount Qf at least at the time of starting the engine 10 by using the starter 25A, the fuel consumption amount can be decreased at the time of starting the engine 10 by using the motor generator 20. As described in the above modified embodiment, even when the maximum MG torque TQmg is higher than or equal to the required starting torque TQsta and if a certain amount of fuel is injected, the engine 10 can be started reliably and smoothly, despite the fact that the maximum MG torque TQmg is temporarily less than the required starting torque TQsta due to some reason.

The assist injection amount Qf at the time of starting the engine 10 by using the starter 25A may vary in accordance with the engine rotation speed Ne. In this case, the assist injection amount Qf at the time of starting the engine 10 by using the motor generator 20 may be smaller than an assist injection amount Qf at the time of starting the engine 10 by using the starter 25A in accordance with comparison based on the same engine rotation speed Ne.

When the engine rotation speed Ne is higher than or equal to the threshold value Nx, the motor generator 20 may apply torque higher than or equal to the required starting torque TQsta to the crankshaft 10a. For example, the motor generator 20 may be controlled so that the maximum MG torque mg can be constantly applied to the crankshaft 10a.

When the engine rotation speed Ne is less than the threshold value Nx (the required starting torque TQsta is higher than the maximum MG torque TQmg), the assist injection amount Qf may be calculated to be a positive fixed value. In this case, the assist injection amount Qf may have any value as long as it compensates the maximum value of the torque shortfall TQsht in a range of the engine rotation speed Ne between zero and the threshold value Nx (in general, the torque shortfall TQsht when the engine rotation speed Ne is zero).

In the above-described embodiment, whether the required starting torque TQsta is higher than the maximum MG torque TQm is determined to determine whether the engine rotation speed Ne is less than the threshold value Nx. However, the engine rotation speed Ne may be directly compared with a predetermined fixed threshold value Nx to determine whether it is less than the threshold value Nx. In the case of the above-described modified embodiment, for example, test or simulations are performed to determine the engine rotation speed Ne when the maximum MG torque TQmg is in agreement with the required starting torque TQsta. Then, the threshold value Nx is set to the rotation speed that is higher than or equal to the thus determined engine rotation speed Nx. As described above, the predetermined threshold value Nx is determined, thus making it possible to omit processes such as calculation of the maximum MG torque TQmg and the required starting torque TQsta or comparison thereof, as described in the embodiment. As a result, it is possible to lower the processing load necessary to calculate the assist injection amount Qf at the time of starting the engine 10.

The threshold value Nx can be determined as a fixed value smaller than the engine rotation speed Ne when the maximum MG torque TQmg is in agreement with the required starting torque TQsta. In the case of the above modified embodiment, when the engine rotation speed Ne becomes higher than or equal to the threshold value Nx, the assist injection amount Qf may be calculated so that a value obtained by adding the maximum MG torque TQmg to the injection torque TQf will be higher than or equal to the required starting torque TQsta. Even in the case of the above modified embodiment, a fuel consumption amount of fuel at the time of starting the engine 10 by using the motor generator 20 can be made lower than a fuel consumption amount at the time of starting the engine 10 by using the starter 25A.

A mode of calculating the maximum MG torque TQmg is not limited to the above-described embodiment. Irrespective of the state of charge of the high-voltage battery 22, for example, the maximum MG torque TQmg may be calculated to be the maximum MG torque TQmg on the assumption that the maximum rated input is constantly input to the high-voltage battery 22. In the case of the above modified embodiment, for example, when the state of charge of the high-voltage battery 22 is lower than a certain value and no maximum rated input can be input to the motor generator 20, the engine 10 may be started by using the starter 25A instead of using the motor generator 20.

Of a series of the start control processes in Step S12, and the like, it is not always necessary to calculate the maximum torque (the maximum MG torque TQmg) that can be applied to the crankshaft 10a by the motor generator 20. For example, if a regular-use rated input is set for the motor generator 20 separately from the maximum rated input with an efficiency of driving the motor generator 20 or suppression of deterioration thereof taken into account, the motor generator torque may be calculated based on the regular-use rated input.

A mode of calculating the minimum starting torque TQmin is not limited to the above-described embodiment. In addition to the friction torque TQfrec and the auxiliary device torque TQaux, for example, other torque may be added.

Further, in a configuration in which auxiliary devices are drivably coupled to the crankshaft 10a of the engine 10 via a clutch or the like, when the drivable coupling between the auxiliary devices and the crankshaft 10a is cancelled at the time of starting the engine 10, the auxiliary device torque TQaux may be calculated by subtracting the torque necessary to drive the auxiliary devices.

The process in which the added torque TQadd is added to the minimum starting torque TQmin (Step S14) may be omitted to set the required starting torque TQsta to the minimum starting torque TQmin as is.

In each of the above-described embodiments, the electronic control unit 30 is not limited to a device that includes a CPU and a ROM and executes software processing. For example, at least part of the processes executed by the software in the above-described embodiments may be executed by hardware circuits dedicated to executing these processes (such as ASIC). That is, the electronic control unit 30 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Therefore, the present examples and embodiments are to be considered as illustrative and not restrictive and the disclosure is not to be limited to the examples and embodiments given herein.

The invention claimed is:

1. An engine start controller that is configured to be mounted on a vehicle, wherein
the vehicle is provided with an engine as a driving source of the vehicle, a motor generator that is drivably coupled to the engine, and a starter configured to start the engine,
the engine start controller comprises an injection amount calculating portion that is configured to calculate, as an assist injection amount, an injection amount of fuel injected from a fuel injection valve of the engine in an engine start-up period until the engine rotation speed exceeds a predetermined starting rotation speed from zero, and
the injection amount calculating portion is configured such that, in a case in which the rotation speed of the engine is higher than or equal to a threshold value that is a value less than the starting rotation speed, the injection amount calculating portion calculates the assist injection amount to be smaller when the engine is started by using the motor generator than when the engine is started by using the starter.

2. The engine start controller according to claim 1 comprising:
a starting torque calculating portion that is configured to calculate, as a starting torque, rotational torque that needs to be applied to a crankshaft in order to start the engine in accordance with a state of the engine; and
a motor generator torque calculating portion that is configured to calculate, as a motor generator torque, rotational torque that can be applied to the crankshaft by the motor generator in accordance with a state of the motor generator,
wherein the injection amount calculating portion is configured to
set the threshold value to the rotation speed of the engine when the motor generator torque is in agreement with the starting torque, and
calculate the assist injection amount as a positive value when the rotation speed of the engine is less than the threshold value.

3. The engine start controller according to claim 2, wherein the injection amount calculating portion is configured to calculate the assist injection amount such that, when the engine rotation speed is less than the threshold value, the greater a difference between the motor generator torque and the starting torque, the greater the assist injection amount becomes.

4. The engine start controller according to claim 2, wherein the injection amount calculating portion is configured to calculate the assist injection amount to be zero when the engine rotation speed is higher than or equal to the threshold value.

5. The engine start controller according to claim 1, wherein
the threshold value is determined in advance as a rotation speed higher than or equal to an engine rotation speed when rotational torque that can be applied to the crankshaft by the motor generator is in agreement with rotational torque that needs to be applied to the crankshaft in order to start the engine, and
the injection amount calculating portion is configured to
calculate the assist injection amount to be a positive value when the rotation speed of the engine is less than the threshold value, and
calculate the assist injection amount to be zero when the rotation speed of the engine is higher than or equal to the threshold value.

\* \* \* \* \*